United States Patent [19]

Hayes

[11] 4,179,779

[45] Dec. 25, 1979

[54] HAND PLANE

[75] Inventor: Robert R. Hayes, Euclid, Ohio

[73] Assignee: Oatey Co., Cleveland, Ohio

[21] Appl. No.: 933,509

[22] Filed: Aug. 14, 1978

[51] Int. Cl.² .................. B23D 71/00; B23D 71/04; B24D 15/04

[52] U.S. Cl. ........................................ 29/78; 29/8 D; 51/392

[58] Field of Search ............... 29/78, 80; 51/392, 393

[56] References Cited

U.S. PATENT DOCUMENTS

| 684,171 | 10/1901 | Berger | 29/78 |
|---|---|---|---|
| 2,839,817 | 6/1958 | Huxtable et al. | 29/80 |
| 4,137,670 | 2/1979 | Goralski | 51/392 |

*Primary Examiner*—Harrison L. Hinson
*Attorney, Agent, or Firm*—Maky, Renner, Otto & Boisselle

[57] ABSTRACT

Planing tool includes an elongated frame having a lower planer surface for supporting an elongated planer blade along its entire length. The elongated frame has a relatively fixed downwardly and outwardly beveled flange at the forward end thereof for engagement by one of the blade mounting tabs and a spring latch adjacent the back end for releasably engaging the other mounting tab securely to hold the blade in place during use of the tool. The spring for the latch has a generally inverted U-shape portion which is retained within the hollow of a generally arch shape handle extending upwardly adjacent the rear of the tool frame. A recess or slot is provided in the lower back wall portion of the handle for receipt of the other blade mounting tab and permitting limited rearward movement of the spring latch into locking engagement with such other blade mounting tab.

12 Claims, 7 Drawing Figures

HAND PLANE

BACKGROUND OF THE INVENTION

This invention relates generally as indicated to a planing tool, and more particularly, to a planing tool for positively retaining an elongated planar blade in place during use while permitting ready removal and replacement of the blade as desired.

Heretofore, it has been the usual practice to attach planar blades to their respective holders by screws and the like in the manner shown, for example, in U.S. Pat. Nos. 2,839,817 and 3,531,841. The use of such screws of course adds to the cost of the device, and also adds to the amount of time required to change blades. In addition, such screws may become damaged or cause damage during use of the tool, and such screws may be misplaced or lost, rendering the tool unusable.

SUMMARY OF THE INVENTION

It is a principal object of this invention to provide an improved planing tool which permits quick change of planer blades.

Another object is to provide such a planing tool which is of a relatively simple and inexpensive construction.

Still another object is to provide such a planing tool which permits the simple application of thumb pressure to the blade latch mechanism to release the blade from the tool.

A further object is to provide such a planing tool which permits blade assembly simply by pulling on the blade after hooking one of the blade mounting tabs over a spring latch until the other blade mounting tab is beyond its associated support, swinging the blade upwardly against the bottom of the tool, and releasing the blade.

These and other objects of the present invention may be achieved by providing the frame portion of the planing tool with a relatively fixed downwardly and outwardly extending beveled flange at the forward end thereof for engagement by one of the blade mounting tabs and a spring latch adjacent the rear end for releasably engaging the other blade mounting tab. The spring for the latch is of generally inverted U-shape and is retained within a generally arch shape handle portion extending upwardly adjacent the rear of the tool. A notch or recess in the lower back wall portion of the handle is adapted to receive the other blade mounting tab and permits limited rearward movement of the spring latch into locking engagement with such other blade mounting tab. The handle is also desirably slotted partway up the back wall to expose part of the outer leg portion of the spring which carries the latch so that such outer leg portion may be pressed inwardly by thumb pressure in order to disengage the spring latch from the associated mounting tab when it is desired to remove the blade. The outer leg portion of the spring is also desirably bowed outwardly or channel shape in the region of the slot so as to protrude into the slot for locating and guiding the spring latch during movement thereof and for ease of pressing engagement by the thumb. Also, such channel imparts additional rigidity and spring latching force to the spring latch.

To the accomplishment of the foregoing and related ends the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

DESCRIPTION OF THE PREFERRED EMBODIMENT

Figure 1:
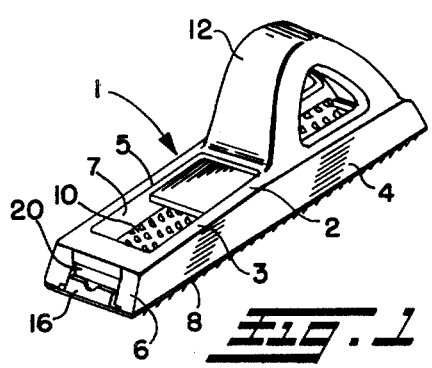
FIG. 1 is a perspective view of a preferred form of planing tool in accordance with the present invention.

Referring now in detail to the drawings, a preferred form of planing tool in accordance with this invention is generally indicated by the reference numeral 1 and comprises an elongated frame 2 having a generally horizontal top wall 3 which may be provided with one or more openings 7 therein to facilitate removal of cuttings or shavings, as required. A pair of laterally spaced downwardly extending parallel flanges or side walls 4, 5 extend along the full length of the frame adjacent the outer edges of the top wall, and a beveled flange 6 extends downwardly from the front of the elongated frame between such side walls.

Figure 3:
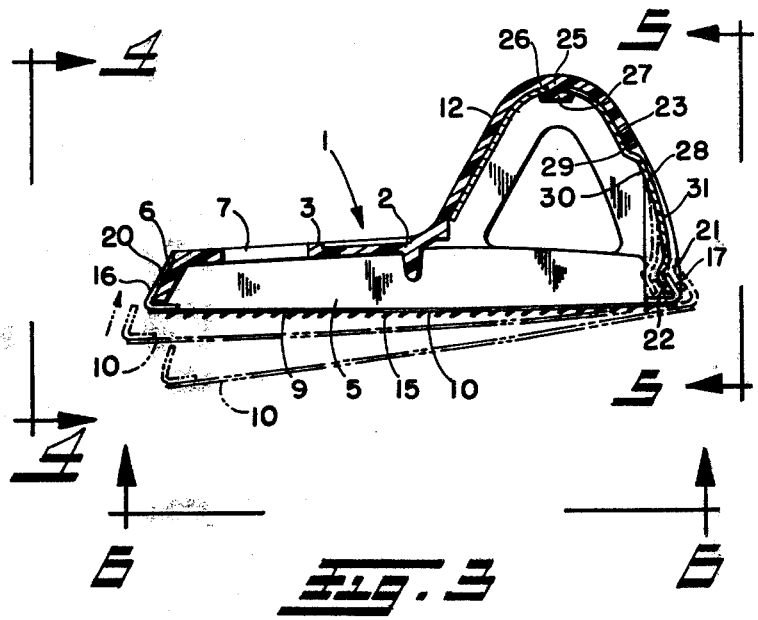
FIG. 3 is a longitudinal section through the tool of FIG. 2, taken on the plane of the line 3—3 thereof.

As clearly shown in FIGS. 1 and 3, the lowermost edges 8, 9 of the respective side walls 4, 5 are substantially flat and straight to provide the desired support for a planer blade 10 throughout its length along the outer marginal edges of the frame. Adjacent the rear of the frame is a generally arch shape handle 12, hollowed out for a purpose to be subsequently described. While different materials may be used for the frame, it is preferably a one piece plastic molded part made, for example, from fiber glass reinforced nylon having the required strength and rigidity.

The blade itself may be of any standard type, for example, of the type shown in U.S. Pat. No. 3,509,611, including a plurality of rows of cutting edges 15, and being either substantially flat or slightly rounded in transverse section across the width of the blade as desired. The actual number, spacing, and configuration of the cutting edges may vary depending on its intended use and whether the blade is to be used to plane such different materials as wood, plastic, or soft metal. The blade is also preferably stamped or otherwise formed from relatively hard sheet metal and subsequently heat treated for long life.

At opposite ends of the blade are inturned hooks or mounting tabs 16, 17 used to secure the blade to the frame, in a manner to be subsequently described. The mounting tabs are of a reduced width relative to the width of the blade, and may be formed integrally with the blade, or separate mounting tabs may be spot welded or otherwise secured thereto.

The length of the blades may also vary, for example, such blades may be on the order of 5½" long for small planing jobs, or 10" long for larger job capabilities, and of course the length of the tool holder will likewise vary depending on the length of the blades and vice versa. Also, for the longer tools, an additional knob-like handle 18 may be provided adjacent the forward end of the tool 1' embodiment shown in FIG. 7. Otherwise, the details of construction and operation of the FIG. 7 embodiment are substantially the same.

Figure 2:
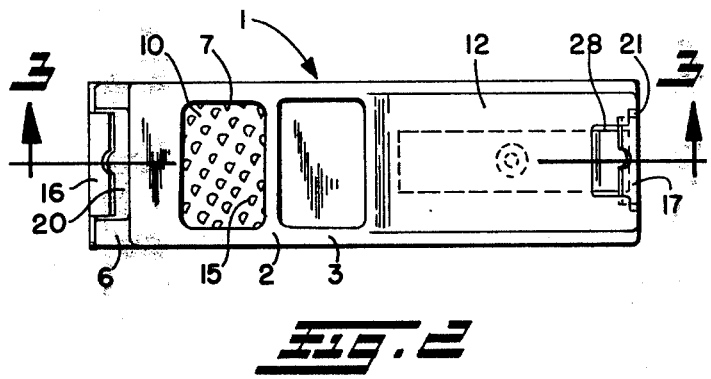
FIG. 2 is a top plan view of the tool of FIG. 1.
Figure 4:
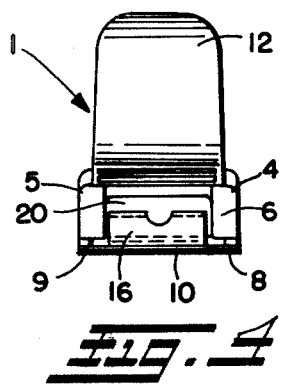
FIG. 4 is a front elevational view of the tool of FIG. 3 as seen from the plane of the line 4—4 thereof.
Figure 5:
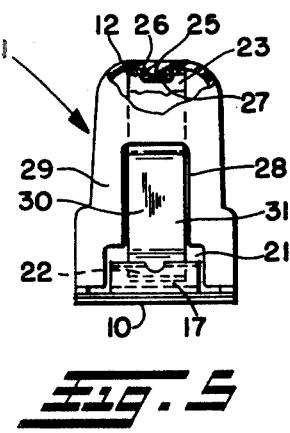
FIG. 5 is a rear elevational view of such tool as seen from the plane of the line 5—5 of FIG. 3, with the upper portion of the handle broken away to show the mount for the spring latch mechanism.
Figure 6:
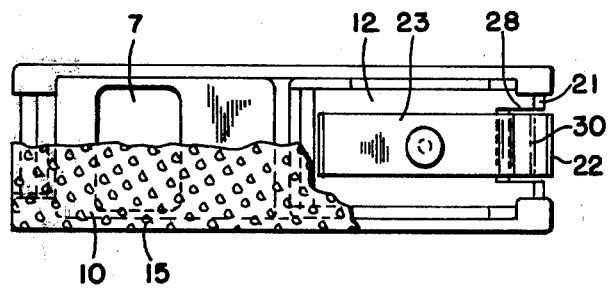
FIG. 6 is a bottom plan view of the tool as seen from the plane of the line 6—6 of FIG. 3 with the planar blade partially broken away.
Figure 7:
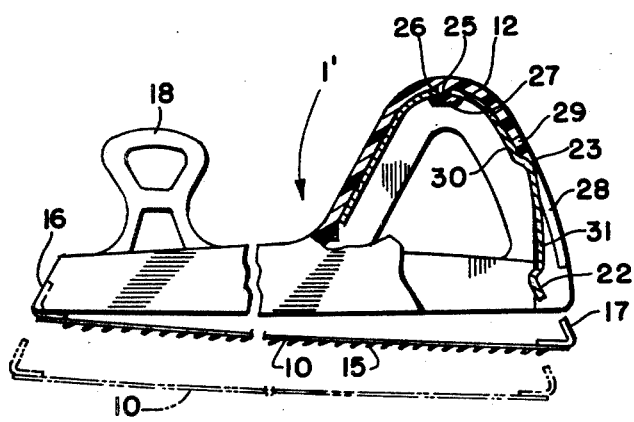
FIG. 7 is a fragmentary longitudinal section, similar to FIG. 3, of a slightly modified form of such planing tool and showing the manner in which the blade is released therefrom.

Referring further to FIGS. 1 through 4, the beveled flange 6 at the forward end of the frame desirably has a slight indentation or recess 20 extending downwardly and outwardly therefrom whose width and angle of inclination substantially correspond to that of the mounting flanges or tabs 16, 17 on the blade, to permit hooking of the forwardmost blade mounting tab 16 thereover for retention thereby. The rear end of the frame is slotted or notched at 21 as shown in FIGS. 2, 5 and 6 for receipt of the other blade mounting tab 17 and retained in place as by an outwardly and downwardly depending spring latch 22. The spring 23 for the latch is of generally inverted U-shape and is mounted within the hollow handle portion 12 of the frame. As best seen in FIGS. 3 and 7, the spring 23, which is preferably made of spring steel, is held in place both by the tension of the spring tending to expand outwardly within the hollow handle portion, and by providing a projection 25 depending from the top of the handle and extending downwardly through a corresponding opening 26 in the spring. The projection 25 shown is molded integrally with the plastic frame, and after assembly of the spring in the handle with the projection extending through the opening therein, the spring may be secured in place by heat staking the molded projection to the spring as indicated by the reference numeral 27.

The handle 12 also preferably has a further slot 28 extending from the notch 21 partway up the back wall 29 thereof to expose part of the outer leg portion 30 of the spring to permit inward flexing of such outer leg portion by thumb pressure or the like to disengage the spring latch 22 from the associated blade mounting tab for removal of the blade therefrom as desired. The outer leg portion of the spring is also desirably slightly bowed outwardly or channel shape as at 31 in the region of the slot 28 so as to protrude into the slot for locating and guiding the spring and facilitate thumb contact thereby. Such channel 31 also provides additional rigidity and spring force to the spring in the region of the spring latch.

As will be evident from FIG. 3, the spring latch 22 greatly facilitates assembly of the blade 10 onto the frame 2, it only being necessary to hook the rearmost blade mounting tab 17 over the spring latch as shown in the rightmost phantom lines in FIG. 3, then pull the blade forwardly to the left until the forwardmost mounting tab 16 is forwardly of the front recess 20 as shown in the leftmost phantom lines and moved upwardly in the direction of the arrow, and finally release the blade to permit the spring 23 to securely seat and retain the blade on the frame as shown in solid lines in FIG. 3. Removal of the blade from the frame is equally simple, it only being necessary to press inwardly on the spring portion 31 to disengage the spring latch 22 from the rearmost blade mounting tab 17 thereby freeing the blade to fall away from the frame as shown in FIG. 7.

From the foregoing, it will now be apparent that the planing tool of the present invention is of a relatively simple and inexpensive construction which nevertheless provides for the positive and secure retention of the blade on the frame during use and also allows for quick blade change without having to use any tools.

Although the invention has been shown and described with respect to a preferred embodiment, it is obvious that equivalent alterations and modifications will occur to other skilled in the art upon the reading and understanding of this specification. The present invention includes all such equivalent alterations and modifications and is limited only by the scope of the claims.

The embodiments of the invention in which an exclusive property or privilege is claimed are defined as follows:

1. A planing tool comprising an elongated frame for supporting an elongated planer blade, said frame having a top wall and a pair of laterally spaced downwardly extending side walls, a beveled face at the forward end of said frame between said side walls for hooking engagement by a first mounting tab on the forward end of the blade, a handle extending upwardly adjacent the rear end of said frame, a recess in the rear end of said frame adapted to receive a second mounting tab on the rear end of the blade, and spring latch means adjacent the rear end of said frame for releasably engaging the second mounting tab and urging such second mounting tab rearwardly for securely retaining the blade on the bottom of said frame.

2. The tool of claim 1 wherein said handle is hollow and a spring is mounted within said hollow handle, said spring supporting said spring latch means adjacent the rear end of said frame and urging said spring latch means rearwardly.

3. The tool of claim 2 wherein said hollow handle is of general arch shape and said spring is of generally inverted U-shape, said spring including an outer leg portion having a generally downwardly and outwardly extending flange at the outermost end thereof defining said spring latch means.

4. The tool of claim 3 wherein said spring is retained in place in said handle by the tension of said spring tending to expand outwardly within said handle.

5. The tool of claim 4 further comprising a projection depending from said handle through an opening in said spring for securing said spring in place within said handle.

6. The tool of claim 5 wherein said projection is made of plastic, and the outer end of said projection is heat staked to said spring.

7. The tool of claim 6 wherein said frame is made of a one-piece plastic molded part.

8. The tool of claim 3 further comprising a slot extending partway up the back wall of said handle exposing part of said outer leg portion of said spring for contact by the thumb to permit inward flexing of said outer leg portion to disengage said spring latch means from the associated mounting tab thus freeing the blade from said tool as desired.

9. The tool of claim 8 wherein said exposed part of said outer leg portion is of a generally channel shape and protrudes into said slot.

10. The tool of claim 1 wherein said beveled face has a recess therein extending downwardly and outwardly therefrom whose width and angle of inclination substantially corresponds to that of the first mounting tab.

11. In combination, a planing tool and an elongated planer blade, said planing tool comprising an elongated frame for supporting said elongated planer blade, said frame having a top wall and a pair of laterally spaced downwardly extending side walls, a beveled face at the forward end of said frame between said sidewalls for hooking engagement by a first mounting tab on the forward end of said blade, a handle extending upwardly adjacent the rear end of said frame, a recess in the rear end of said frame adapted to receive a second mounting tab on the rear end of said blade, and spring latch means adjacent the rear end of said frame for releasably engaging said second mounting tab and urging said second mounting tab rearwardly for securely retaining said blade on the bottom of said frame, said handle being hollow, and a spring mounted within said hollow handle, said spring supporting said spring latch means adjacent the rear end of said frame.

12. The combination of claim 11 wherein said hollow handle is of generally arch shape and said spring is of generally inverted U-shape, said spring including an outer leg portion having a generally downwardly and outwardly depending flange at the outermost end thereof defining said spring latch means, and a slot extending partway up the back wall of said handle exposing part of said outer leg portion of said spring for contact by the thumb to permit inward flexing of said outer leg portion to disengage said spring latch means from said second mounting tab to permit removal of said blade as desired.

* * * * *